Oct. 8, 1957  A. A. BROWN  2,809,353
MAGNETIC AMPLIFIER MODULATOR
Filed Sept. 30, 1954

INVENTOR.
ABBOTT A. BROWN
BY
ATTORNEY

United States Patent Office 2,809,353
Patented Oct. 8, 1957

2,809,353

MAGNETIC AMPLIFIER MODULATOR

Abbott A. Brown, Paramus, N. J., assignor to Bendix Aviation Corporation, Teterboro, N. J., a corporation of Delaware Application September 30, 1954, Serial No. 459,260

8 Claims. (Cl. 332—51)

This invention relates to magnetic amplifiers and more particularly to a magnetic amplifier modulator.

In aviation instrument landing systems, the ILS receiver carried in aircraft has a localizer channel and a glide-path channel. The electrical output of all receivers used in ILS and omnirange equipment is a reversible polarity direct current. In order to make this information usable in automatic pilot systems, the aforementioned direct current output from the receivers must be converted into proportional carrier frequency voltage. The present invention provides a novel magnetic amplifier which is usable in instrument landing systems and other systems and apparatus where amplification and control is required.

An object of the present invention is to provide a novel magnetic amplifier modulator which will convert low level direct current output, such as employed in ILS equipment, into a modulated frequency proportional in amplitude and modulation frequency to the input signal with maximum fidelity usable in a coupler.

A further object of the invention is to provide a novel balance winding means for correcting the null in a servo magnetic amplifier.

A further object is to provide a novel magnetic amplifier modulator which has an electrical adjustment means to provide a null.

Another object of the invention is to provide a novel magnetic amplifier modulator which is extremely stable with temperature variations.

A further object is to provide a novel magnetic amplifier modulator which is small in size, reliable in operation, and requires no pulsating to eliminate hysteresis.

A further object is to provide a novel modulator which requires very little power and eliminates hysteresis.

Another object is to provide a magnetic amplifier modulator which is economical to manufacture, efficient in operation, and extremely rugged.

The present invention contemplates a servo magnetic amplifier which has a direct current excited balance winding that produces a null in the device to offset the signal discrepancy ordinarily present due to manufacturing tolerances. A resistor is serially connected in the balance winding circuit, the value of the resistor being determined when the device is tested at zero signal condition. A pair of cores are used each having a bias and an excitation winding, the bias windings of both cores being connected in series opposition, as are the excitation windings, but there is no magnetic coupling between the cores. The control and balance windings are wound around both cores. The balance winding sets up a flux in each of the cores in a predetermined direction and, with a balance resistor, provides means for nulling the device by a proper balancing current.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 1:
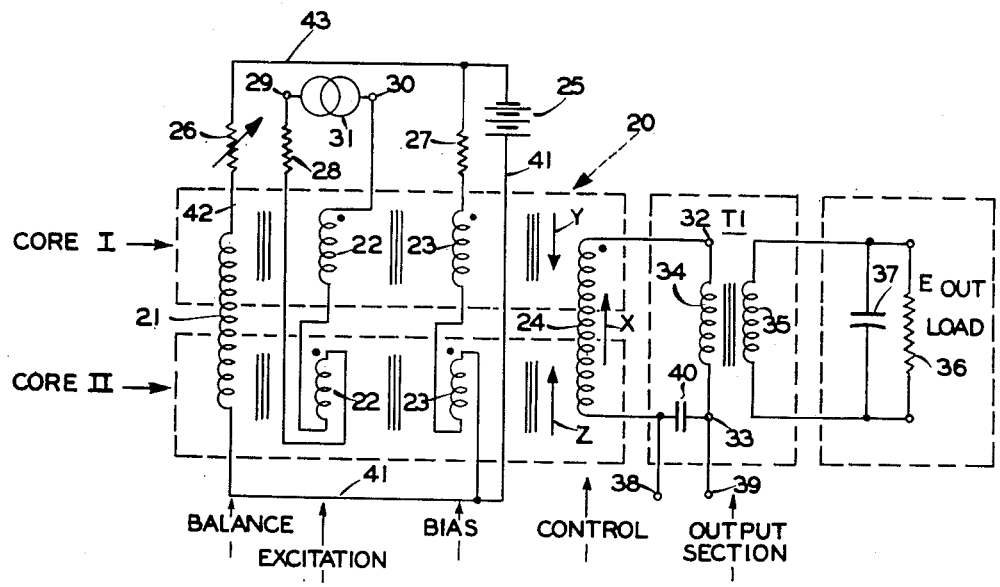
Fig. 1 is a schematic diagram of the modulator.

Referring to the drawings and more particularly to Fig. 1, there is shown a modulator 20 having a balance winding 21, a two-part excitation winding 22, a two-part bias winding 23, and a control winding 24.

The device has two cores of high permeability magnetic material. The cores may be toroidal discrete tape wound or any other desirable cores may be used. Each core has a separate excitation winding portion and a separate bias winding portion, with a balance winding and a control winding being wound around both of the cores with the individual cores being of the tape wound type.

The balance winding 21, wound around both cores I and II, has a balance winding circuit which includes a source of direct current potential 25, which is serially connected with a balancing resistor 26 of the variable type, and the balance winding 21, via conductors 41 to 43.

The bias winding 23 is serially connected with a source of direct current 25, which source is serially connected with the two portions of the bias winding wound on cores I and II, and a dropping resistor 27, to provide a bias winding circuit. The two coils of the bias winding 23 are connected in series opposition as indicated by the dots on the drawings adjacent their respective components, in a conventional dot system, to indicate the start and finish of the windings.

An excitation winding circuit includes the two portions of the excitation winding 22 positioned, respectively, on cores I and II of the modulator. The excitation windings are connected in series opposition with each other, and in series with a dropping resistor 28, to terminals 29 and 30 for connection to a source of alternating current excitation 31.

The control winding 24, wound on both cores I and II, is connected to output terminals 32 and 33, which are in turn connected, via capacitor 40, to the primary 34 of a transformer T1, which is a coupling transformer. A secondary 35 of the transformer T1 is shown serially connected to a load resistor 36, and having a fixed tuning capacitor 37, connected across said load. Input terminals 38 and 39 are connectable to a signal voltage Es, which terminals are, while being in shunt with capacitor 40, also serially connected with the control winding 24 and the primary winding 34 of transformer T1.

At a "no signal" condition, both of the excitation windings on cores I and II have some impedance when the coils are connected to a constant current source of excitation of a predetermined frequency, for example, 400 cycles. The control winding 24 is magnetically coupled to both portions of the excitation winding, since the control winding 24 is wound around both cores I and II. However, there is no magnetic coupling between the cores I and II per se. The excitation windings on cores I and II both induce voltages in the control winding 24, but since the voltages are of equal magnitude and of opposite polarity, they cancel out, and zero voltage appears across the control winding 24.

The bias windings of cores I and II are connected to the source 25 of direct current potential, for magnetizing the cores near saturation and thereby preventing hysteresis. The direct current bias of each coil sets up a direct current flux in its respective core, with the flux sources being equal and opposite.

At the "signal" condition, the signal Es, which is a direct current voltage, provides the signal current in the control winding 24. All of the direct current of the signal flows through the control winding 24 and the primary 34 of the transformer T1, since no direct current can flow through the capacitor 40. Capacitor 40 is of large value and, consequently, represents an alternating current short circuit so that any alternating current voltage appearing across the control winding 24 will appear unattenuated across the primary winding 34 of T1. With a given polarity, the signal current sets up a direct current flux in both cores I and II. This flux produced by the signal current is in one direction, as shown by the arrow X, and therefore opposes the bias flux in one core, as shown by the arrow Y, and aids the bias flux in the other core, as shown by the arrow Z.

The core in which the fluxes aid becomes more saturated and the impedance of that particular core's winding (core II) decreases. The core in which the fluxes oppose becomes less saturated, and the impedance of that particular core's winding increases. Therefore, there will be unequal voltage drops across the excitation winding resulting in unequal voltages induced in the control winding 24. The resultant voltage appears across the primary winding 34 of transformer T1.

The purpose of the balance winding is to produce a null in the device. This is desirable because, for a zero signal input, ordinarily there is not a resultant zero output signal due to manufacturing tolerances, such as core permeability, winding turn counts, and distributed capacitance.

Therefore, the balance winding 21 provides a means for nulling the modulator by means of a very low balancing current. The value of resistor 26, which is shown as being variable, may be a fixed resistor which is selected at the signal tested predetermined value of the modulator to produce the desired low null. In effect, this low null current unbalances the modulator in a direction opposite to that caused by the manufacturing tolerances.

The resistor 27 adjusts the bias current to some predetermined value depending upon the defined sensitivity. The resistor 28 sets the alternating current excitation to some predetermined value.

Figure 2:
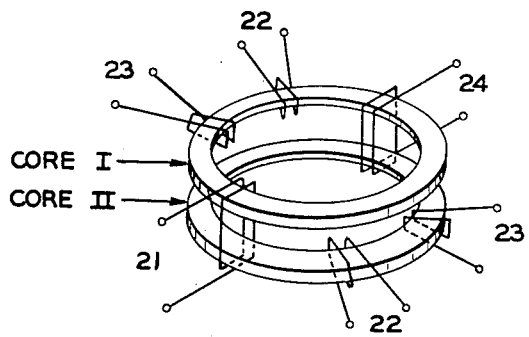
Fig. 2 is a perspective view showing the mechanical arrangement of the windings relative to a pair of cores.

In Fig. 2, the perspective-schematic shows two discrete cores, with core I and core II each having a bias winding 23 and an excitation winding 22, and with the control and balance windings 24, 21 being wound about both cores I and II. While the cores are mechanically distinct and there is no magnetic coupling therebetween, it is pointed out that the balance and control windings each are disposed to embrace both cores I and II.

While the circuit of Fig. 1 shows a bias winding in order that the output frequency will not be doubled by passing through the coupling transformer, it is to be understood that the balance or null setting winding may be used in a magnetic amplifier without a bias winding for the purposes set forth herein. The balance winding circuit, under this latter condition of absence of bias winding, will produce the desired null. The balance winding circuit may be used in any magnetic amplifier or comparable saturable reactor circuit to offset the undesirable effects resulting from manufacturing tolerances or coil mismatch in general.

From the foregoing, it will be seen that the output will be a carrier frequency whose amplitude is proportional to the amplitude of the direct current input signal. If the input signal is modulated at a fixed or varying rate, the amplitude of the output will vary at this same fixed or varying rate. Hence, the output will be modulated in accordance with the input.

The balance winding circuit provides a null setting means which eliminates a mechanical adjustment or a precise matching operation of the magnetic amplifier components, and the device inherently produces a minimum electrical null determined by the value of the resistor ascertained by test.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a magnetic amplifier having a pair of toroidal shaped cores of magnetic material with an excitation winding on each of said cores and with said windings connected in series opposition and excited by alternating voltage of predetermined frequency, and a control winding on both of said cores connected to terminals for a signal source and a load, a balance winding circuit including a balance winding, attenuating means, and a source of unidirectional voltage, said balance winding being disposed on both of said cores to provide flux for influencing the magnetic amplifier output, said attenuating means being of a value to produce a minimum electrical null when a signal and a load are connected to said output winding, to the end that when a unidirectional signal source and a load are connected to said terminals said load will be energized by an alternating current having a voltage amplitude proportional to the amplitude of the signal source.

2. In a magnetic amplifier having a pair of toroidal shaped cores of magnetic material with an excitation winding disposed on each of said cores and with said windings connected in series opposition, and a control winding formed around both of said cores and connected to a signal source and a load, a balance winding circuit including a balance winding, attenuating means, and a source of unidirectional voltage, said balance winding being formed on both of said cores for influencing the output, said attenuating means being of a value to produce an electrical null when a signal and a load are connected to said output winding and when the excitation winding is connected to an excitation source of predetermined frequency.

3. In a magnetic amplifier having a pair of toroidal shaped cores of magnetic material with an excitation winding on each of said cores and with said windings connected in series opposition, and a control winding formed on both of said cores, a balance winding circuit including a balance winding disposed on said core and attenuating means, said balance winding being disposed on said core for influencing the magnetic amplifier output, said attenuating means being of a value to produce an electrical null at the output when a signal and a load are connected to said control winding and when the excitation winding is connected to an excitation source of predetermined frequency and when the balance winding circuit is energized by a unidirectional voltage which is a function of the attenuating means.

4. A magnetic amplifier modulator having two cores of magnetic material, an excitation winding disposed on each of said cores and said windings being connected in series opposition, a control winding wound on both of said cores, a coupling device connected in series with said control winding, whereby when a unidirectional signal source is connected to said control winding and said coupling device, and upon energization of said excitation winding by an alternating current, unequal voltages will be induced in the control winding and the alternating current voltage difference thereof will appear across the coupling device corresponding in amplitude to the amplitude of the unidirectional input signal.

5. A magnetic amplifier modulator having two cores of magnetic material, an excitation winding disposed on each of said cores and said windings being connected in series opposition, a control winding wound on both of said cores, a coupling device connected in series with said control winding, and a unidirectional signal source connected to said control winding and said coupling device, whereby upon energization of said excitation winding by an alternating current unequal voltages will be induced in the control winding and the alternating current voltage difference thereof will appear across the coupling device corresponding in amplitude to the amplitude of the unidirectional input signal.

6. A magnetic amplifier modulator having two cores of magnetic material, an excitation winding disposed on each of said cores and said windings being connected in series opposition, a bias winding disposed on each of said cores and said bias windings being connected in series opposition, a source of unidirectional voltage connected to said bias windings for magnetizing the separate cores near saturation to prevent hysteresis, a control winding wound on both of said cores, a coupling device having a winding connected in series with said control winding, and a unidirectional signal source connected to the series circuit including said control winding and the winding of said coupling device, whereby upon energization of said excitation winding by an alternating current, unequal voltages will be induced in the control winding and the alternating current voltage difference thereof will appear across the winding of the coupling device corresponding in amplitude to the amplitude of the unidirectional input signal.

7. A magnetic amplifier modulator having two discrete tape wound cores of magnetic material, an excitation winding disposed on each of said cores and said windings being connected in series opposition, a balance winding disposed on both of said cores, a unidirectional voltage connected to said balance winding, and a resistor connected with said balance winding and being of a value to provide a null for the modulator, a bias winding disposed on each of said cores and said bias windings being connected in series opposition, a source of unidirectional voltage connected to said bias winding for magnetizing the separate cores near saturation to prevent hysteresis, an output winding wound on both of said cores, a coupling device having a winding connected in series with said output winding, and a unidirectional signal source connected to said output winding and the winding of said coupling device, whereby upon energization of said excitation winding by an alternating current unequal voltages will be induced in the output winding and the alternating current voltage difference thereof will appear across the winding of the coupling device corresponding to the amplitude of the unidirectional input signal.

8. A magnetic amplifier having two cores of magnetic material, an excitation winding disposed on each of said cores and said windings being connected in series opposition, a bias winding disposed on each of said cores and said bias windings being connected in series opposition, a source of unidirectional voltage connected to said bias windings, a control winding wound on both of said cores, an output coupling device having a winding connected in series with said control winding, and a unidirectional signal source connected to said control winding and the winding of said coupling device, whereby upon energization of said excitation winding unequal voltages will be induced in the control winding and the voltage difference which appears across the coupling device winding will correspond in amplitude to the unidirectional signal.

References Cited in the file of this patent
UNITED STATES PATENTS

| | | |
|---|---|---|
| 1,462,038 | Hartley | July 17, 1923 |
| 2,164,383 | Burton | July 4, 1939 |
| 2,503,039 | Glass | Apr. 4, 1950 |
| 2,700,130 | Geyger | Jan. 18, 1955 |